a)
1 
2    I b)
1    I 
2    I c)
1    I 
2    I d)
1 
2    I

United States Patent Office 3,367,836
Patented Feb. 6, 1968

3,367,836
PROCESS FOR THE EXTRACTION OF
ELASTASE
Yvonne Thuillier, Paris, France, assignor to Laboratoires
Albert Rolland, Paris, France, a French society
Filed Oct. 12, 1964, Ser. No. 403,410
Claims priority, application Great Britain, Oct. 10, 1963,
40,047/63
3 Claims. (Cl. 167—75)

This invention relates to an improved process for the extraction of an enzymic product having elastolytic activity, and to the product thus obtained which is characterised by superior properties compared with those of the elastase which has been available hitherto.

It is known that the pancreas of mammals contains a specific elastase, the concentration of which decreases with the age of the animals. It also contains an inactive proenzyme, proelastase, which is converted into its active form under the influence of trypsin and enterokinase. Elastase has mucolytic, lipolytic and proteolytic activity, and possesses a higher digestive power and a more specific activity than trypsin or chymotrypsin. It acts on the metabolism of the elastic tissues by virtue of its capacity for solubilising elastin.

In the process of the invention, the enzymic product having elastolytic activity is obtained from a delipidated pancreas powder, obtained by conventional extraction of the pancreas with acetone and ether. The crude enzymic product is thereafter extracted with the aid of an $M/100$ sodium acetate buffer at a pH between 4.8 and 5. The extract thus obtained is then precipitated with the aid of ammonium sulphate in a concentration between 48% and 55%, and the precipitate is filtered, resuspended and demineralised by dialysis.

Under these conditions, there is obtained an impure water-insoluble product which is non-homogeneous to electrophoresis. It can be purified by means of fractional precipitations in the presence of an alcohol such as methanol or, preferably, ethanol. In a first precipitation, in which a 50% alcohol is employed, proteins containing no elastolytic product are precipitated and are removed by filtration. A second precipitation is thereafter effected with the aid of an alcohol in a concentration of about 80% and a precipitate is obtained which contains the purified elastolytic product.

The product is cold-centrifuged and redissolved in an $M/100$ sodium acetate buffer at a pH between 4.7 and 5 and lyophilised. The operation may with advantage be carried out in the presence of calcium ions, which have a stabilising effect on the elastolytic product.

The various stages of the process are preferably carried out at a low temperature, for example below 5° C. and preferably in the neighborhood of $-2°$ C.

The elastolytic product obtained in accordance with the invention has an isoelectric point of $9.5 \pm 0.5$. It is sparingly soluble in water at pH below 4.5 and in order to solubilise it, it is necessary to increase the pH.

Figure 1:
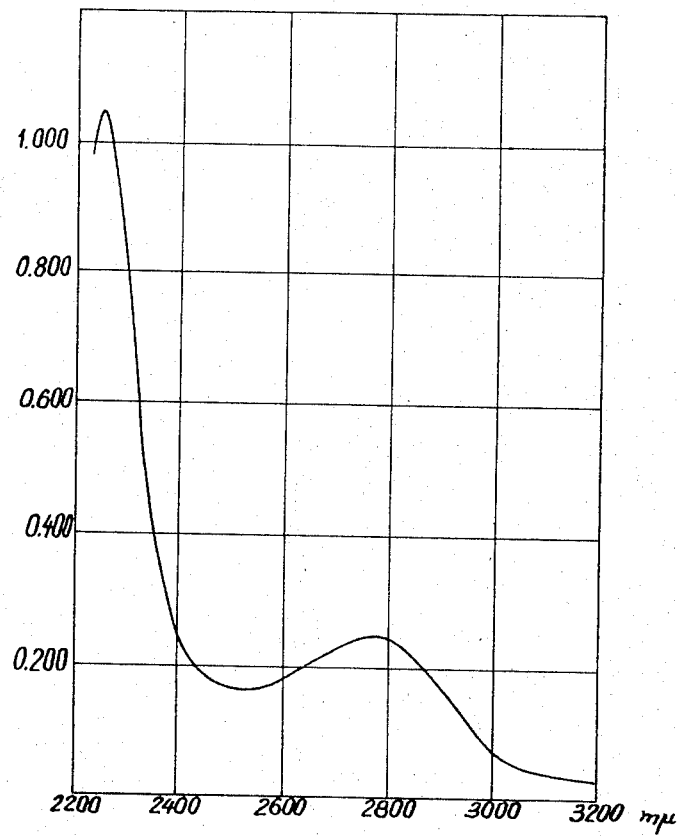

The ultra-violet absorption spectrum of the product according to the invention has been produced, measured in a buffer of pH 8.7, obtained by means of a mixture of 50 cubic centimeters of a solution consisting of:
 —12.405 g. boric acid,
 —14.912 g. potassium chloride,
 —Twice-distilled water, q.s. for 1 litre,
and 14 cc. of normal sodium hydroxide diluted to 1/5, this buffer being made up to 200 cc. by twice-distilled water. The pH is adjusted if necessary to obtain the value of 8.7. 2.4 cc. of the buffer is employed, to which is added 0.1 cc. of concentrated elastolytic product. Under these conditions, the spectrum illustrated in the accompanying FIGURE 1 was obtained, which is characterised by two peaks, one at 2,200 A. and the other at 2,800 A.

The elastolytic activity of the product according to the invention was measured as follows:

18 mg. of elastin were first introduced into small Erlenmeyer flasks in the presence of a buffer of sodium carbonate and hydrochloric acid ($N/100$) of which the pH was 8.8. The elastolytic product solution to be analysed was added so as to obtain 18 cc. and tests were made with increasing contents of the product according to the invention. Solutions of 1 mg./cc. representing substantially 100 micrograms per cc. of proteins were used. The elastolytic product solution was used in amounts of 0.5 l. and 1.5 cc. After filtration, the specimen was tested in the spectrophotometer at 2,800 A. The figure read corresponds to the optical density illustrating the solubilised elastin.

Under these conditions, the values given in Table 1 were obtained for a constant value of elastin and for a solution always containing 18 cc. as a function of the quantity of the elastolytic product:

TABLE 1

| Solution of the elastolytic product in a concentration of 100 micrograms per cc. | Reading on the spectrophotometer after— | | |
|---|---|---|---|
| | ½ hour | 1 hour | 1½ hours |
| 0.5 cc | 200 | 390 | 560 |
| 1 cc | 380 | 520 | 580 |
| 1.5 cc | 490 | 595 | 620 |

Since the number of units of elastolytic product is a function of the quantity of elastin, other tests were made in which the quantity of elastin was varied with the same quantity of elastolytic product, and the determination was effected as a function of the increase of the ultraviolet absorption for the 2,800 A. band, after the incubation had been effected as above with elastin at 37° C. For these tests, a pure elastolytic product solution in a concentration of 100 micrograms per cc. was employed. There was extracted therefrom 0.5 cc., 12 cc. of water was added and for the determination, 1 cc. of such a solution was employed. In the Table 2 below, there are given as a function of the quantities of elastin, the results obtained on the spectrophotometer at the end of 1, 2 and 3 hours respectively.

TABLE 2

| Elastin | 1 hour | 2 hours | 3 hours |
|---|---|---|---|
| 0 | 0.099 | 0.105 | 0.095 |
| 5 mg | 0.155 | 0.250 | 0.380 |
| 15 mg | 0.205 | 0.335 | 0.535 |
| 20 mg | 0.215 | 0.450 | 0.600 |
| 30 mg | 0.295 | 0.600 | 0.860 |

Figure 2:
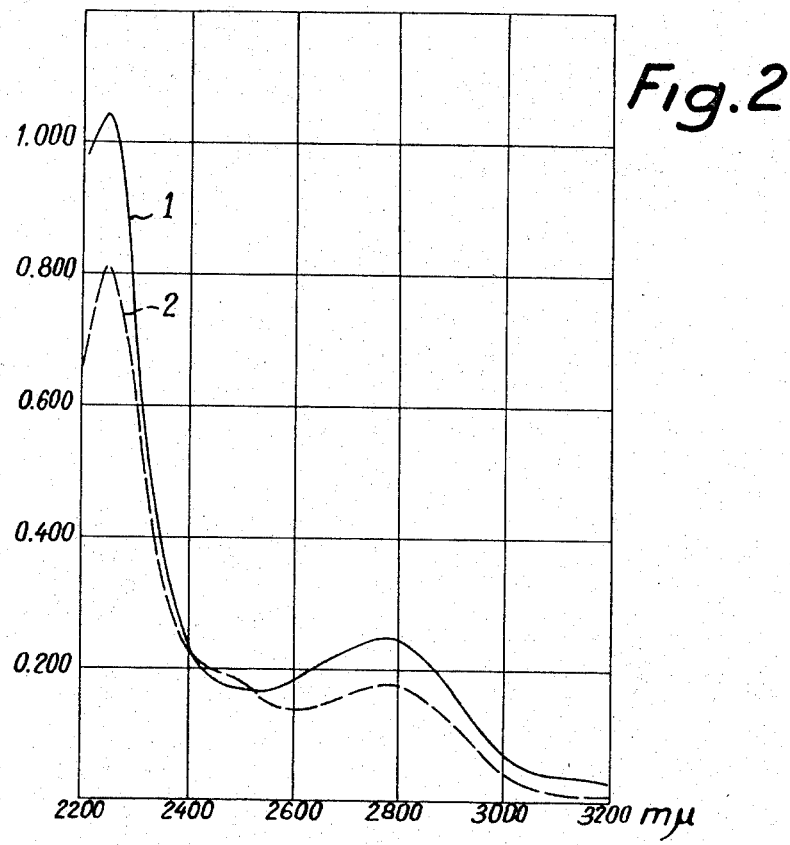

The elastolytic product of the invention was compared with a standard elastase marketed under the name "Ensizer." The ultra-violet absorption spectra of the two products are given in the accompanying FIGURE 2 in which curve 1 represents the spectrum of the product of the invention, and curve 2 that of the commercial product.

The specific activities of the two products are given in the following Table 3, which shows the values obtained on the spectrophotometer after incubation for 3 hours with reference to a substrate with and without elastin. In each case, 1 cc. of an elastolytic product solution, prepared as explained above, was employed. Product (1) is the product according to the invention, and Elastase (2) was the commercial product.

TABLE 3

| Elastin | Elastolytic product (1) | Elastase (2) | Reading after 3 hours |
|---|---|---|---|
| 0 | 1 cc | | 0.095 |
| 30 mg | 1 cc | | 0.860 |
| 0 | | 1 cc | 0.062 |
| 30 mg | | 1 cc | 0.145 |

It can be seen from Table 3, that a great difference exists between the two products tested, which clearly indicates that the elastolytic product of the invention is much purer.

Isolation is effected by electrophoretic migration on agar, and characterisation of the fractions thus obtained from the elastolytic compound according to the invention, is carried out by comparison with a commercial elastase.

In the following test, O stands for the compound of the invention, and S is a product, marketed under the name of "Ensizer."

(1) The constituents of the elastolytic compounds are separated by electrophoresis in agar on a "Scheidegger" micro-plate, in using the following medium and test conditions:

—Agar—1.5% sodium barbital,
—Sodium barbital buffer with a view of obtaining an 8.2 pH ionic strength 0.05 and a voltage of 100 volts for 60 minutes.

Figure 3:
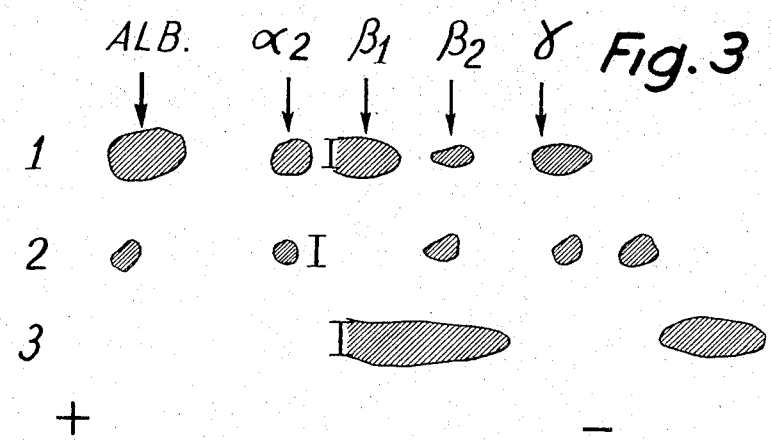

The results are shown in FIG. 3 of the accompanying drawings.

For the elastolytic compound O, two fractions (3 in FIG. 3) are obtained, and for elastase S, five fractions (2 in FIG. 3).

With respect to the constituents of normal human serum (1 in FIG. 3), the mobilities of which are known, the following results were obtained:

For the elastolytic compound O, one obtains:

1 fraction having the mobility of $\beta_1$, $\beta_2$ globulins, and
1 fraction having a mobility lower than $\gamma$ globulins.

As far as elastase S is concerned, one obtains:

1 fraction having the mobility of albumins and rapid liproproteins,
1 fraction having the mobility of $\alpha_2$ globulin,
1 fraction having the mobility of $\beta_1$, $\beta_2$ globulins,
1 fraction having the mobility of $\gamma$ globulins,
1 fraction having a mobility which is slower than $\gamma$ globulins.

Figure 4:
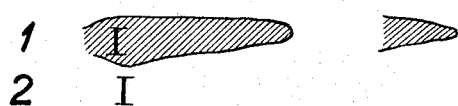
Figure 4:
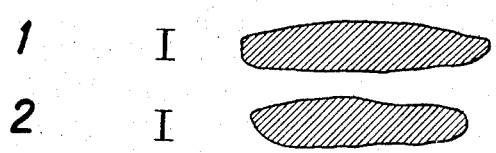
Figure 4:
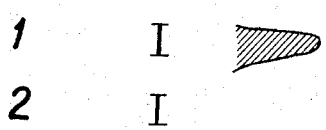
Figure 4:
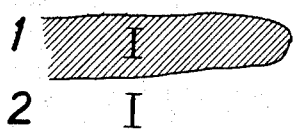

(2) Characterisation of some of the above-cited isolated fractions was carried out:

The results are depicted in FIG. 4 of the accompanying drawings, wherein 1 refers to the product of the invention and 2 to the commercially available product "Ensizer."

(a) By determination of esterases: it is observed that the two fractions of the elastolytic compound O have an activity, in particular the $\beta_1$, $\beta_2$ fraction.

Elastase S did not show any activity.

(b) By determination of elastolytic activity. When comparing the two elastolytic compounds, it was observed that the product O shows an activity which is three times as high, and in a zone of identical mobility, as regards fractions showing a slower migration than the one of $\gamma$ globulins.

(c) By characterisation of lipoproteins. Only the outer zone of the fraction having $\beta_1$, $\beta_2$ mobility of the elastolytic compound O in its slow portion, has taken up the Sudan Black coloration.

(d) By characterisation of nucleic acids. The outer zone of the $\beta_1$, $\beta_2$ fraction of the elastolytic compound O takes up the pyronin in forming a line, descending backwards in the test container, as far as zone $\alpha_2$.

There was equally characterised the elastolytic compound of the invention by specific immunologic precipitation.

For this purpose first of all an anti-serum in rabbit was prepared as follows:

Two rabbits Nos. 59 and 60 are subjected to several series of injections with the compound according to the invention with Freund adjuvant, as shown in the following table.

Rabbit No. 50 is subjected to injections with the commercially available "Ensizer" with Freund adjuvant.

After each series of injections blood is taken from the rabbits by sanguine puncture, as shown in the following table.

After immunoelectrophoresis on agar, it is noticed that the two compounds have different electrophoretic mobility, and that they are precipitated in an absolutely selective manner with the respective anti-serums, after each series of injections or at the end of the injections when these compounds are brought together with blood samples taken from rabbits by puncture and consequently containing the respective anti-serums.

For this purpose precipitation arcs were formed by applying the Ouchterlony method, using agar—15% sodium barbital at a pH of 8.2, or Michaelis agar at a pH of 9, the anti-elastase of rabbit at 0.1 elastolytic units per container, the compound of the invention and commercial elastase at 1 milligram per container.

IMMUNISATION WITH FREUND ADJUVANT

| | Compound of the invention | | Commercial elastase | Number of days |
|---|---|---|---|---|
| | Rabbit 59 | Rabbit 60 | Rabbit 50 | |
| ID | 1 mg | 1 mg | 1 mg | 0 |
| SC | 1 mg | 1 mg | 1 mg | 19 |
| IV | 1 mg | 1 mg | 1 mg | 20 |
| IV | 1 mg | 1 mg | 1 mg | 21 |
| PS | 5 cc | 5 cc | 5 cc | 26 |
| SC | 1 mg | 1 mg | 1 mg | 39 |
| IV | 1 mg | 1 mg | 1 mg | 40 |
| IV | 1 mg | 1 mg | 1 mg | 41 |
| PS | 5 cc | 5 cc | 5 cc | 47 |
| SC | 1 mg | 1 mg | 1 mg | 61 |
| IV | 1 mg | 1 mg | 1 mg | 62 |
| IV | 1 mg | 1 mg | 1 mg | 63 |
| PS | 5 cc | 5 cc | 5 cc | 69 |
| Total of the injected compound. | 10 mg | 10 mg | 10 mg | |

Remarks:
 ID=intradermically,
 SC=subcutaneously,
 IV=intravenous,
 PS=sanguine puncture.

Pharmacological study of the product of the invention showed that the product was perfectly well tolerated by rabbits and rats to which it had been administered daily by the parenteral route, in a proportion of 500 gammas of the pure compound according to the invention in aqueous solution per kg. of body weight. After such a treatment for 10 days, the animals were observed and showed no anomaly. After a further 10 days period of absorption, the animals were sacrificed, and a post-mortem examination showed that no organ exhibited any signs of inflammation, lesion or irritation.

The tolerance of the product according to the invention was studied in common male and female rabbits. Prior to any treatment the animals were subjected to a clinical observation of 10 days (weighing and measuring temperature every 48 hours).

Upon confirmation of a normal growth of the animals, they were divided into 4 batches of animals having a mean weight of 3 kg.:

—Batch (a) . . . 10 female rabbits,
—Batch (b) . . . 10 female control rabbits,
—Batch (c) . . . 10 male rabbits,
—Batch (d) . . . 10 male control rabbits.

After an observation period, the rabbits of batches (a) and (c) were given elastolytic compound in two parenteral administrations daily, of 2,000 elastolytic units (E.U.) per kilogramme for 8 weeks. This dosage is ten times higher than the human dosage determined per kilogramme.

The dosage was administered in an aqueous suspension of 6,000 elastolytic units per ml.

The rabbits of batches (b) and (c) which serve as a control, were administered the corresponding volume of water for the same period of time and in the same manner.

At the end of the treatment after administration of the product had been stopped, the animals were again observed clinically for 10 days.

After this new period of observation the rabbits were sacrificed and subjected to autopsy.

Histological cuttings, embedded in paraffin, were made from takings of liver, kidneys, ileum and stomach, heart, lungs.

During the whole test period the animals had been fed in the same manner.

The experiment shows that the product is well tolerable. In fact, growth of the animals continued normally. Moreover, autopsy did not shown any symptom of inflammation, lesion or irritation.

The investigations made within the scope of the present invention allowed of making the following observations and verifications as regards the enzymatic compound of the present invention, having elastolytic activity:

(1) The pancreas of diabetics who are very liable to arteriosclerosis, is free of elastolytic compounds.

(2) It was confirmed by assays made with labelling substances ($S^{35}$), that with progressing age of the human organism, all those elements of the elastolytic compound-elastin system diminish, which are concerned in senile involution. According to one theory, it is assumed that the elastolytic compound acts on the connective tissue of the vessels, by freeing mucopolysaccharides (decomposition of the aged elastic fibre with a release of the acidic and sulfur-containing fractions) which, together with the inhibitor of the serum ($\alpha$ globulin fraction), participates in forming the clearing factor in the connective tissue and in the serum.

(3) The enzyme, supposing it is found in the blood circulation, will be found at a low proportion.

(4) A serum inhibitor of the elastolytic compound exists in the plasma.

The product according to the invention may be utilised by injection, presented, for example, in lyophilised flasks. It may be useful for regularising lipoprotein transfers at the level of tissues, the arteries and the various organs as the liver. It acts on the proportion of lipids in the serum and on the glycoprotein values.

Thus the elastolytic compound according to the invention is particularly useful in the compensation of the enzymatic deficiency of arteriosclerous organisms.

What I claim is:

1. A process of preparing from delipidated pancreatic powder an enzymatic composition having elastolytic activity with reference to elastin, said enzymatic composition having an isoelectric point of 9.5±0.3, low solubility in water below pH 4.5, an ultra-violet absorption spectrum showing peaks at 2,200 and 2,800 A., and upon electrophoresis showing two constituents, one having a slower mobility than the $\alpha$ globulins of blood serum and being able to digest elastin, and the second having the mobility of the $\beta_1$, $\beta_2$ globulins of blood serum, comprising the steps:
   (1) extraction of said powder with $M/100$ sodium acetate buffer at a pH between about 4.8 and 5;
   (2) precipitation of active material by addition to extract of ammonium sulfate in a concentration of between about 48 to 55%;
   (3) demineralization of said precipitate of active material by dialysis;
   (4) fractional precipitation with ethanol or methanol comprising the steps of:
      (a) a first precipitation in about 50% ethanol or methanol to remove inactive material, and
      (b) a second precipitation in about 80% ethanol or methanol of active material;
   (5) solution of active material in an $M/100$ sodium acetate buffer at a pH between about 4.7 and 5; and
   (6) lyophilization, said steps being carried out at a temperature less than about 5° C.

2. A process according to claim 1, wherein the fractional precipitations with ethanol or methanol are carried out in the presence of calcium ions.

3. A process according to claim 1, wherein the temperature is at about —2° C.

References Cited
UNITED STATES PATENTS 2,886,489  5/1959  Grant _____ 167—75

ALBERT T. MEYERS, *Primary Examiner.*

SAM ROSEN, *Examiner.*

L. B. RANDALL, *Assistant Examiner.*